(12) United States Patent
McKinstry

(10) Patent No.: US 6,570,738 B1
(45) Date of Patent: May 27, 2003

(54) TAPE HEAD MODULES HAVING ADJACENT SUBSTRATES EACH PROVIDED WITH WRITE AND/OR READ ELEMENTS

(75) Inventor: Kevin Dale McKinstry, Laporte, CO (US)

(73) Assignee: Storage Technology Corporation, Louisville, CO (US)

( * ) Notice: Subject to any disclaimer, the term of this patent is extended or adjusted under 35 U.S.C. 154(b) by 118 days.

(21) Appl. No.: 09/632,152

(22) Filed: Aug. 3, 2000

(51) Int. Cl.[7] ................................................. G11B 5/79
(52) U.S. Cl. ....................................................... 360/121
(58) Field of Search ................... 360/121, 129

(56) References Cited

U.S. PATENT DOCUMENTS

| | | |
|---|---|---|
| 4,439,793 A | 3/1984 | Nater |
| 4,839,197 A | 6/1989 | Henderson |
| 5,541,793 A * | 7/1996 | Schwarz ..................... 360/121 |
| 5,546,650 A | 8/1996 | Dee |
| 5,855,056 A | 1/1999 | Cates |
| 5,923,506 A | 7/1999 | Herrera |
| 5,930,086 A | 7/1999 | Chaug et al. |
| 5,963,400 A | 10/1999 | Cates et al. |
| 5,997,381 A | 12/1999 | Dee et al. |
| 6,002,554 A | 12/1999 | Schmalhorst et al. |

FOREIGN PATENT DOCUMENTS

| | | | |
|---|---|---|---|
| JP | 57 210418 A | 12/1982 | |
| JP | 60 010407 A | 1/1985 | |
| JP | 61 013414 A | 1/1986 | |
| JP | 62 008315 A | 1/1987 | |
| JP | 62 170009 A | 7/1987 | |
| JP | 62 073409 A | 9/1987 | |
| JP | 62 256206 A | 11/1987 | |
| JP | 03 209612 A | 9/1991 | |
| JP | 4-325909 * | 11/1992 | ................. 360/121 |
| JP | 05 046942 A | 2/1993 | |
| JP | 6-342508 * | 12/1994 | ................. 360/121 |

* cited by examiner

*Primary Examiner*—A. J. Heinz
(74) *Attorney, Agent, or Firm*—Brooks & Kushman P.C.

(57) ABSTRACT

A module for a tape head assembly includes a first substrate having active elements and a second substrate having active elements. The active elements on the first and second substrates can be read elements, write elements, or a combination of read and write elements. The second substrate is positioned over the first substrate. In one embodiment, the active elements of the first substrate are aligned between the active elements of the second substrate when the second substrate is positioned over the first substrate. In a second embodiment, the active elements of the first substrate are aligned directly across the active elements of the second substrate when the second substrate is positioned over the

9 Claims, 2 Drawing Sheets

TAPE HEAD MODULES HAVING ADJACENT SUBSTRATES EACH PROVIDED WITH WRITE AND/OR READ ELEMENTS

TECHNICAL FIELD

The present invention relates to the field of dynamic magnetic information storage or retrieval. More particularly, the present invention relates to the field of magnetic tape heads. In still greater particularity, the present invention relates to magnetic tape head modules. By way of further characterization, but not by way of limitation thereto, the present invention relates to a module of a tape head assembly having adjacent substrates in which each substrate includes write and/or read elements.

BACKGROUND ART

In magnetic recording technology it is constantly desired to improve the areal density at which information can be recorded and read. This desire has lead a trend toward shrinking track widths of a magnetic media such as tape. A tape drive having a head assembly is used to write and read data to and from magnetic tape. The head assembly includes modules connected together. Each module has a substrate of active elements such as write and read elements. Typically, a mechanical closure piece is bonded over the substrate for each module.

In order to record and read data to and from magnetic tape having closely spaced tracks, the head assembly will need to have more tracks per inch (TPI) in the head, i.e., more write and read elements per unit length, and smaller gap to gap spacings between the elements to reduce the effects of media deformation and read/write alignment on track misregistration. Efforts to increase TPI at the wafer level lead to vastly increased complexity on the wafer build process and subsequent yield loss. Efforts to decrease gap to gap spacing by reducing substrate and closure thickness result in an increased fragility of the head assembly and subsequent yield loss. These requirements can be addressed by using an adjacent substrate assembly process for a head assembly in which a substrate of active elements is used in place of the mechanical closure piece that is typically used in the head assembly.

SUMMARY OF THE INVENTION

Accordingly, it is an object of the present invention to provide a tape head module having adjacent substrates in which each substrate includes write and/or read elements.

It is another object of the present invention to provide a tape head module having adjacent substrates in which each substrate includes write elements.

It is a further object of the present invention to provide a tape head module having adjacent substrates in which each substrate includes read elements.

It is still another object of the present invention to provide a tape head module having adjacent substrates in which one substrate includes write elements and the other substrate includes read elements.

It is still a further object of the present invention to provide a tape head module having adjacent substrates in which one substrate includes a combination of write and/or read elements and the other substrate includes a complimentary combination of write and/or read elements.

It is yet another object of the present invention to provide a tape head module having adjacent substrates in which each substrate includes horizontal and vertical alignment marks to enable the adjacent substrates to be properly aligned with respect to one another.

It is yet a further object of the present invention to provide a tape head module having adjacent substrates each provided with substrate pads for connecting the active elements of the substrates to the external environment in which the substrate pads are offset with one another.

In carrying out the above objects and other objects, the present invention provides a module for a tape head assembly including a first substrate having active elements and a second substrate having active elements. The second substrate is positioned over the first substrate. In one embodiment, the first substrate has a row of spaced apart write elements and the second substrate has a row of spaced apart write elements. The write elements of the first substrate are aligned between the write elements of the second substrate when the second substrate is positioned over the first substrate. In another embodiment, the first substrate has a row of spaced apart read elements and the second substrate has a row of spaced apart read elements. The read elements of the first substrate are aligned between the read elements of the second substrate when the second substrate is positioned over the first substrate. In a further embodiment, the first substrate has a row of write elements and the second substrate has a row of read elements. The write elements of the first substrate are aligned directly across with the read elements of the second substrate when the second substrate is positioned over the first substrate.

Preferably, the first and second substrates have front surfaces with the active elements of the first and second substrates located on the front surfaces of the first and second substrates. The front surfaces of the first and second substrates face each other when the second substrate is positioned over the first substrate. The front surfaces of the first and second substrates each include a set of substrate pads and conductive leads. Each conductive lead connects an active element to a corresponding substrate pad. The substrate pads connect the active elements to an external device. Each set of substrate pads are positioned on one side of the substrates such that each set of substrate pads are offset with respect to one another when the second substrate is positioned over the first substrate. Each substrate includes a window on the other side of the substrates for exposing the offset substrate pads when the second substrate is positioned over the first substrate.

Preferably, the first and second substrates include horizontal alignment marks for horizontally aligning the first and second substrates when the second substrate is positioned over the first substrate. The horizontal alignment marks are referenced with respect to the active elements. Preferably, the first and second substrates include vertical alignment marks for vertically aligning the first and second substrates when the second substrate is positioned over the first substrate. The vertical alignment marks are referenced with respect to the active elements.

In carrying out the above objects and other objects, the present invention further provides a method for assembling the module of the tape head assembly of the present invention.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

Figure 1:
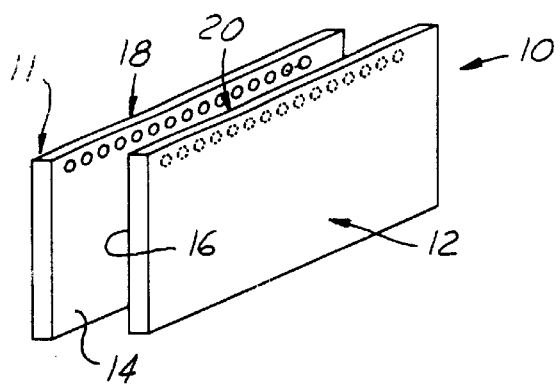
FIG. 1 illustrates a pair of substrates which forms a module of a tape head assembly in accordance with the present invention.
Figure 2:
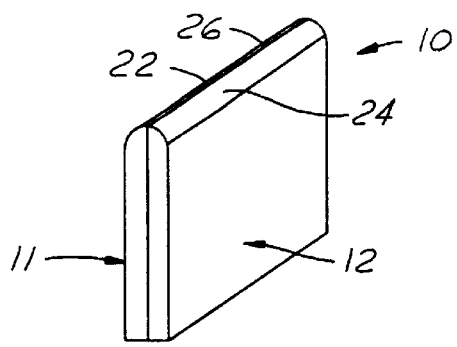
FIG. 2 illustrates an assembled module of the tape head assembly in accordance with the present invention.

Referring now to FIGS. 1 and 2, a tape head module 10 in accordance with the present invention is shown. Tape head module 10 is one module out of many modules that make up a tape head assembly. Tape head module 10 includes a pair of substrates 11, 12 which form the tape head module. Each substrate 11, 12 includes a respective front surface 14, 16. Each front surface 14, 16 has a row of aligned active elements 18, 20 located on the respective front surfaces. Active elements 18, 20 may be write and/or read elements for writing and reading data tracks on magnetic tape. All of the elements of a substrate may be identical. For example, all of elements 18 of substrate 11 are either write or read elements. Consequently, substrate 11 is either a write or read substrate. Similarly, all of elements 20 of substrate 12 are either write or read elements. Consequently, substrate 12 is either a write or read substrate. Of course, each substrate 11, 12 may include a combination of write and read elements.

To form tape head module 10, substrates 11, 12 are positioned adjacent to each other with front surfaces 14, 16 facing each other. Elements 18, 20 of each front surface 14, 16 are then aligned. After elements 18, 20 are aligned, substrates 11, 12 are bonded or joined together to form tape head module 10 as shown in FIG. 2. Edges 22, 24 of substrates 11, 12 are machined to form a tape contour 26 after the substrates are joined together.

Substrate 12 takes the place of the mechanical closure piece that would typically be placed over substrate 11. By placing substrate 12 over substrate 11 instead of placing a mechanical closure piece over substrate 11 the number of tracks per unit length of the head assembly can be increased and the gap separation of the head assembly can be decreased. To increase the number of tracks per unit length like substrates 11, 12 would be joined together with the elements 18, 20 of each substrate offset relative to one another to form a module. For example, write substrates 11, 12 are joined together with write elements 18, 20 of each substrate offset relative to one another to form a write module. Similarly, read substrates 11, 12 are joined together with read elements 18, 20 of each substrate offset relative to one another to form a read module. To reduce the gap separation a write substrate 11 is coupled to a read substrate 12 with write elements 18 aligned with read elements 20 to form a write/read module.

Figure 3:
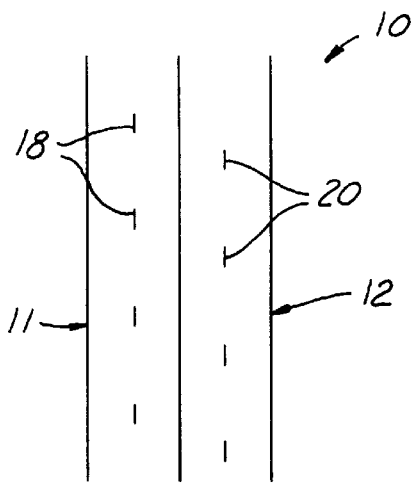
FIG. 3 illustrates a pair of like substrates joined together as a module of the tape head assembly in accordance with the present invention for increasing the tracks per unit length in the tape head assembly.

FIG. 3 illustrates a pair of like substrates 11, 12 joined together as a module for increasing the number of tracks per unit length. Like substrates 11, 12 are either a pair of write or read substrates. Each substrate 11, 12 has like elements 18, 20. Elements 18, 20 are positioned offset relative to one another such that the elements of one substrate are aligned with the empty spaces between the elements of the other substrate. As a result of aligning elements 18, 20 between the empty spaces the tracks per unit length for module 10 is effectively doubled.

Figure 4:
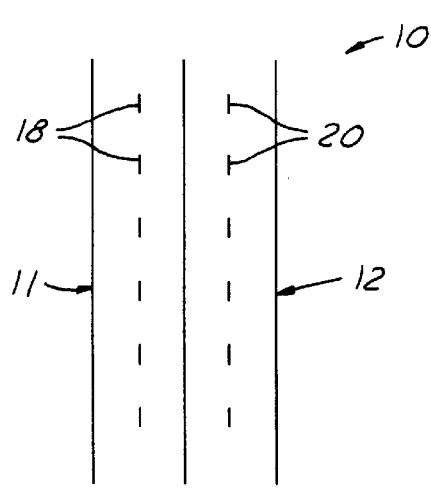
FIG. 4 illustrates a pair of different substrates joined together as a module of the tape head assembly in accordance with the present invention for reducing the gap separation in the tape head assembly.

FIG. 4 illustrates a pair of different substrates 11, 12 joined together as a module for reducing the gap separation. For instance, substrate 11 is a write substrate having write elements 18 and substrate 12 is a read substrate having read elements 20. Elements 18, 20 are aligned with respect to one another such that each write element is directly aligned with a corresponding read element. As a result of aligning elements 18, 20 with respect to one another the gap separation for module 10 is effectively halved.

Figure 5:
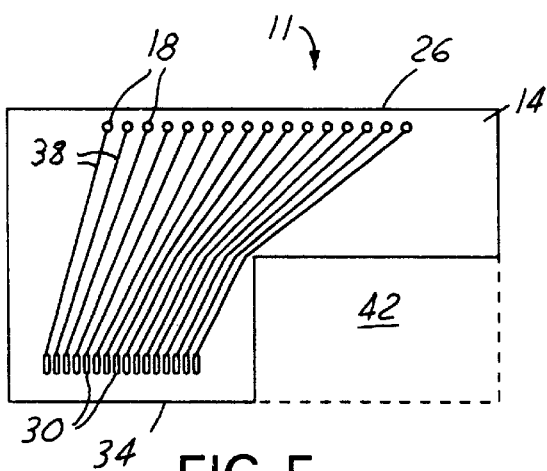
FIGS. 5 and 6 respectively illustrate front surfaces of the adjacent substrates of a module of the tape head assembly in accordance with the present invention.
Figure 6:
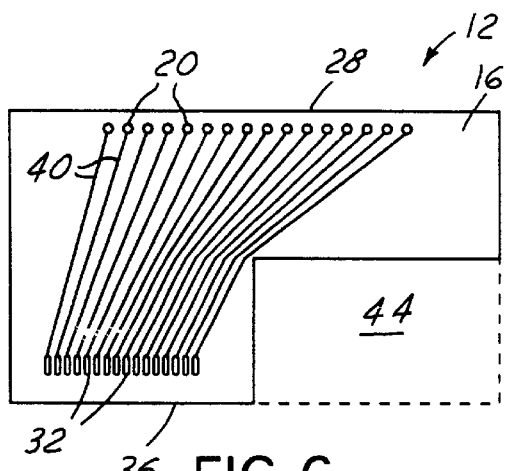

FIGS. 5 and 6 respectively illustrate front surfaces 14, 16 of substrates 11, 12. Each substrate 11, 12 includes respective rows of elements 18, 20 which are located adjacent top sides 26, 28 of substrates 11, 12 on front surfaces 14, 16. Each substrate 11, 12 further includes respective rows of bond or substrate pads 30, 32. Substrate pads 30, 32 are located adjacent bottom sides 34, 36 of substrates 11, 12 on front surfaces 14, 16. Substrate pads 30, 32 are used connect elements 18, 20 of substrates 11, 12 to an external device such as write or read electronic components to enable communication between the elements and the external device. A flex cable (not shown) connects substrate pads 30, 32 to the external device. A plurality of conductive leads 38, 40 connect elements 18, 20 to substrate pads 30, 32. Each lead 38, 40 connects an element 18, 20 with a substrate pad 30, 32.

As shown in FIGS. 5 and 6, each set of substrate pads 30, 32 are positioned on one side (e.g., the left side as shown in FIGS. 5 and 6) on front surfaces 14, 16 of substrates 11, 12. Each substrate 11, 12 includes a window 42, 44 shown by dotted lines positioned on the other side (e.g., the right side as shown in FIGS. 5 and 6). Windows 42, 44 define portions of substrates 11, 12 which have been cut out to expose substrate pads 32, 30 when the substrates are joined together. Windows 42, 44 expose substrate pads 32, 30 to provide a pair of flex cables access to the substrate pads when substrates 11, 12 are joined together.

Figure 7:
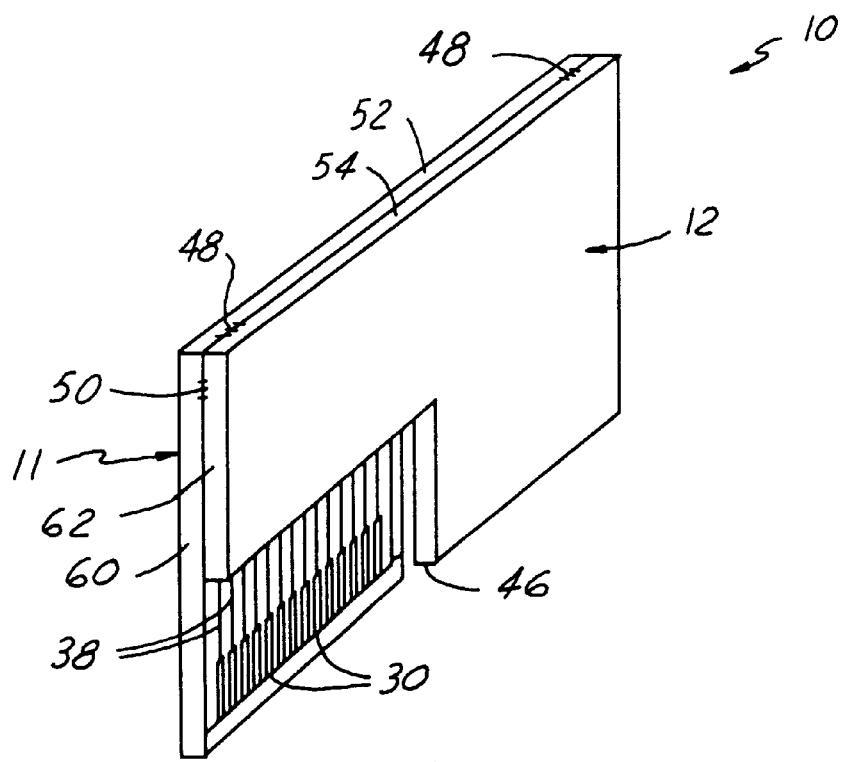
FIG. 7 illustrates a pair of substrates joined together to form a module of the tape head assembly in accordance with the present invention.

FIG. 7 illustrates a pair of substrates 11, 12 joined together to form a module 10. As shown, substrate pads 30 of substrate 11 are accessible by a flex cable through window 44 of substrate 12. Similarly, substrate pads 32 of substrate 12 are accessible by a flex cable through window 42 of substrate 11 (not shown in FIG. 7).

Difficulties in constructing a module 10 having adjacent substrates 11, 12 include lead extraction. Lead extraction is difficult because substrate pads 30, 32 face each other when substrates 11, 12 are joined together making it challenging to attach flex cables. Placing substrate pads 30, 32 on one side of substrates 11, 12 in conjunction with providing windows 42, 44 on the other side of the substrates solves this problem. It should be noted that although substrate pads 30, 32 on a completed module 10 face two different directions only one flex cable is necessary to connect all of the substrate pads. To enable the use of only one flex a clearance 46 is provided between substrates 11, 12 when the substrates are joined together. Clearance 46 allows a flex cable to be positioned over each set of substrate pads 30, 32. Further, the flex cable may be slit at the bond end to access each set of substrate pads 30, 32.

Further difficulties in constructing a module 10 having adjacent substrate 11, 12 include horizontal and vertical alignment of the substrates with respect to one another. Horizontal alignment is important to track location on the finished head assembly. Vertical alignment is necessary to maintain throat height of write elements and stripe height in read elements.

Figure 8:
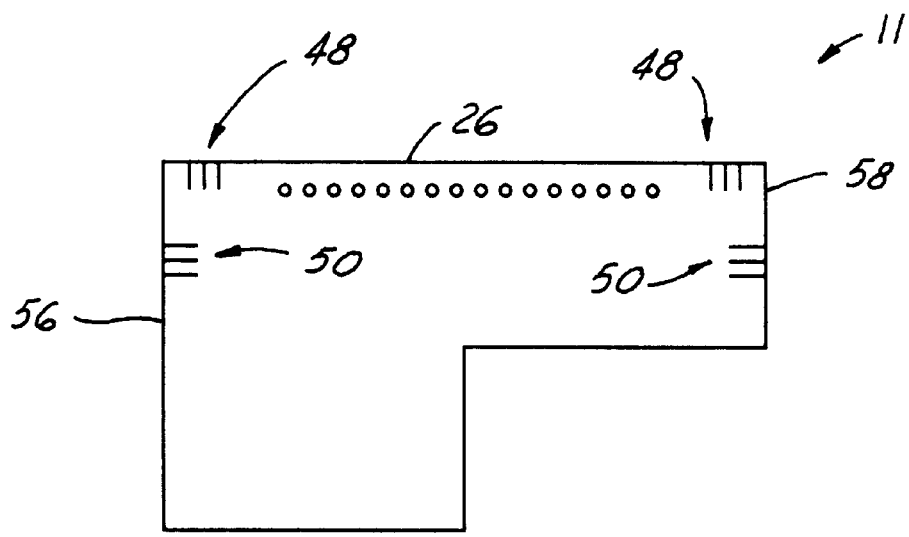
FIG. 8 illustrates alignment marks provided on each substrate of a module for aligning the substrates with respect to one another to form a module of a tape head assembly in accordance with the present invention.

Referring now to FIG. 8, with continual reference to FIG. 7, each substrate 11, 12 includes visible alignment marks in order to horizontally and vertically align the substrates with respect to one another. Each substrate 11, 12 includes a pair of horizontal alignment marks 48 and a pair of vertical alignment marks 50. Horizontal alignment marks 48 are located adjacent top surface 26, 28 of substrates 11, 12 on front surfaces 14, 16 and top side surfaces 52, 54. Horizontal alignment marks 48 are perpendicular to top surfaces 26, 28 and run parallel down front surfaces 14, 16 and run parallel across top side surfaces 52, 54 as shown in FIGS. 7 and 8. Vertical alignment marks 50 are located adjacent left and right surfaces 56, 58 of substrates 11, 12 on front surfaces 14, 16 and left and right side surfaces 60, 62. Vertical alignment marks 50 are perpendicular to left and right surfaces 52, 54 and run parallel across front surfaces 14, 16 and run parallel across left and right side surfaces 60, 62 as shown in FIGS. 7 and 8.

Alignment marks 48, 50 on substrates 11, 12 are the key to horizontally and vertically aligning the substrates such that when the substrates are parted the alignment marks are visible on the parted substrates. In the assembly process alignment marks 48, 50 are lined up on each of the two substrates 11, 12 before bonding. Because alignment marks 48, 50 are separated by only the substrate overcoat thickness it is anticipated that the substrate-substrate alignment could be held close to the same tolerance as that seen on mask-substrate alignment in clean room photo processes. Horizontal alignment marks 48 are referenced to track edges (e.g., edge of a write pole). Vertical alignment marks 50 are referenced to zero throat for write elements and zero stripe height for read elements.

Thus it is apparent that there has been provided, in accordance with the present invention, a tape head module having adjacent substrates in which each substrate includes write and/or read elements that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A module for a tape head assembly comprising:
a first substrate having a row of spaced apart write elements; and
a second substrate having a row of spaced apart write elements, wherein the second substrate is positioned over the first substrate;
wherein the first and second substrates have front surfaces, wherein the write elements of the first and second substrates are located on the front surfaces of the first and second substrates, wherein the front surfaces of the first and second substrates face each other when the second substrate is positioned over the first substrate, wherein the write elements of the first substrate are aligned between the write elements of the second substrate when the second substrate is positioned over the first substrate;
wherein the front surfaces of the first and second substrates each include a set of substrate pads and a plurality of conductive leads, each conductive lead connects a respective write element to a corresponding substrate pad, wherein the substrate pads connect the write elements to an external device and each set of substrate pads are positioned on one side of the substrates such that each set of substrate pads are offset with respect to one another when the second substrate is positioned over the first substrate.

2. The module of claim 1 wherein:
the first and second substrates include a tape contour when the second substrate is positioned over the first substrate.

3. The module of claim 1 wherein:
each substrate includes a window on the other side of the substrates for exposing the offset substrate pads when the second substrate is positioned over the first substrate.

4. The module of claim 1 wherein the first and second substrates include horizontal alignment marks for horizontally aligning the first and second substrates when the second substrate is positioned over the first substrate.

5. The module of claim 4 wherein:
the horizontal alignment marks are referenced with respect to the active elements.

6. The module of claim 4 wherein:
the first and second substrates include vertical alignment marks for vertically aligning the first and second substrates when the second substrate is positioned over the first substrate.

7. The module of claim 6 wherein:
the active elements of the first and second substrates are write elements and the vertical alignment marks are referenced with respect to zero throat of the write elements.

8. The module of claim 6 wherein:
the active elements of the first and second substrates are read elements and the vertical alignment marks are referenced with respect to zero stripe height of the read elements.

9. A module for a tape head assembly comprising:
a first substrate having a row of spaced apart read elements; and
a second substrate having a row of spaced apart read elements, wherein the second substrate is positioned over the first substrate;
wherein the first and second substrates have front surfaces, wherein the read elements of the first and second substrates are located on the front surfaces of the first and second substrates, wherein the front surfaces of the first and second substrates face each other when the second substrate is positioned over the first substrate, wherein the read elements of the first substrate are aligned between the read elements of the second substrate when the second substrate is positioned over the first substrate;
wherein the front surfaces of the first and second substrates each include a set of substrate pads and a plurality of conductive leads, each conductive lead connects a respective read element to a corresponding substrate pad, wherein the substrate pads connect the read elements to an external device and each set of substrate pads are positioned on one side of the substrates such that each set of substrate pads are offset with respect to one another when the second substrate is positioned over the first substrate.

* * * * *